United States Patent
Yao et al.

(10) Patent No.: US 11,990,979 B2
(45) Date of Patent: *May 21, 2024

(54) SATELLITE MIMO SYSTEM

(71) Applicant: AST & Science, LLC, Miami, FL (US)

(72) Inventors: Huiwen Yao, Potomac, MD (US); Abel Avellan, Coral Gables, FL (US); Sriram Jayasimha, Edinburgh (GB); Zhi Zhong Yu, Reading (GB)

(73) Assignee: AST & Science, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,960

(22) Filed: Nov. 28, 2022

(65) Prior Publication Data
US 2023/0102838 A1    Mar. 30, 2023

Related U.S. Application Data

(63) Continuation of application No. 16/941,120, filed on Jul. 28, 2020, now Pat. No. 11,515,935.

(60) Provisional application No. 62/884,951, filed on Aug. 9, 2019, provisional application No. 62/936,955, filed on Nov. 18, 2019.

(51) Int. Cl.
| | |
|---|---|
| *H04B 7/185* | (2006.01) |
| *H04B 7/01* | (2006.01) |
| *H04B 7/0413* | (2017.01) |
| *H04B 7/155* | (2006.01) |

(52) U.S. Cl.
CPC .......... *H04B 7/18521* (2013.01); *H04B 7/01* (2013.01); *H04B 7/0413* (2013.01); *H04B 7/1555* (2013.01)

(58) Field of Classification Search
CPC ........ H04B 7/01; H04B 7/0413; H04B 7/155; H04B 7/18521; H04B 7/18534
See application file for complete search history.

(56) References Cited

U.S. PATENT DOCUMENTS

| | | | |
|---|---|---|---|
| 9,973,266 B1 * | 5/2018 | Avellan | H04B 7/18519 |
| 11,515,935 B2 * | 11/2022 | Yao | H04B 7/1555 |
| 2007/0243822 A1 | 10/2007 | Monte | |
| 2008/0247351 A1 | 10/2008 | Dankberg et al. | |
| 2009/0034448 A1 | 2/2009 | Miller et al. | |

(Continued)

FOREIGN PATENT DOCUMENTS

WO    2008086415 A1    7/2008

OTHER PUBLICATIONS

International Search Report and Written Opinion for PCT/US20/43896, dated Oct. 28, 2020, 16 pages.

(Continued)

*Primary Examiner* — David B Lugo
(74) *Attorney, Agent, or Firm* — Botos Churchill IP Law LLP

(57) ABSTRACT

A base station for communication with a terminal station having a plurality of terminal station antennas. The base station has a plurality of directional antennas, each of the plurality of directional antennas in communication with satellites in view. The base station also has a processing device (e.g., eNodeB) to transmit each of the multiple base-station antenna signals via each of the plurality of directional antennas to satellites and/or the beams of the same satellite seen by the terminal station for retransmission to the plurality of terminal station antennas.

9 Claims, 4 Drawing Sheets

(56) References Cited

U.S. PATENT DOCUMENTS

| | | |
|---|---|---|
| 2015/0236781 A1 | 8/2015 | Jalali |
| 2016/0014728 A1 | 1/2016 | Seo |
| 2017/0041830 A1 | 2/2017 | Davis et al. |
| 2017/0086255 A1 | 3/2017 | Jayasimha |
| 2018/0241464 A1 | 8/2018 | Michaels |
| 2019/0020397 A1 | 1/2019 | Chang et al. |
| 2019/0238216 A1 | 8/2019 | Avellan et al. |
| 2021/0175964 A1 | 6/2021 | Kusashima |

OTHER PUBLICATIONS

Extended European Search Report issued in corresponding European Patent Application No. 20852176.5, dated Jul. 10, 2023, 8 pages.

\* cited by examiner

UE AND MIMO SATELLITES'
POSITIONING THAT YIELD THE
WORST-CASE DIFFERENTIAL
DELAY FOR UE AT THE EDGE
OF A 48km CELL

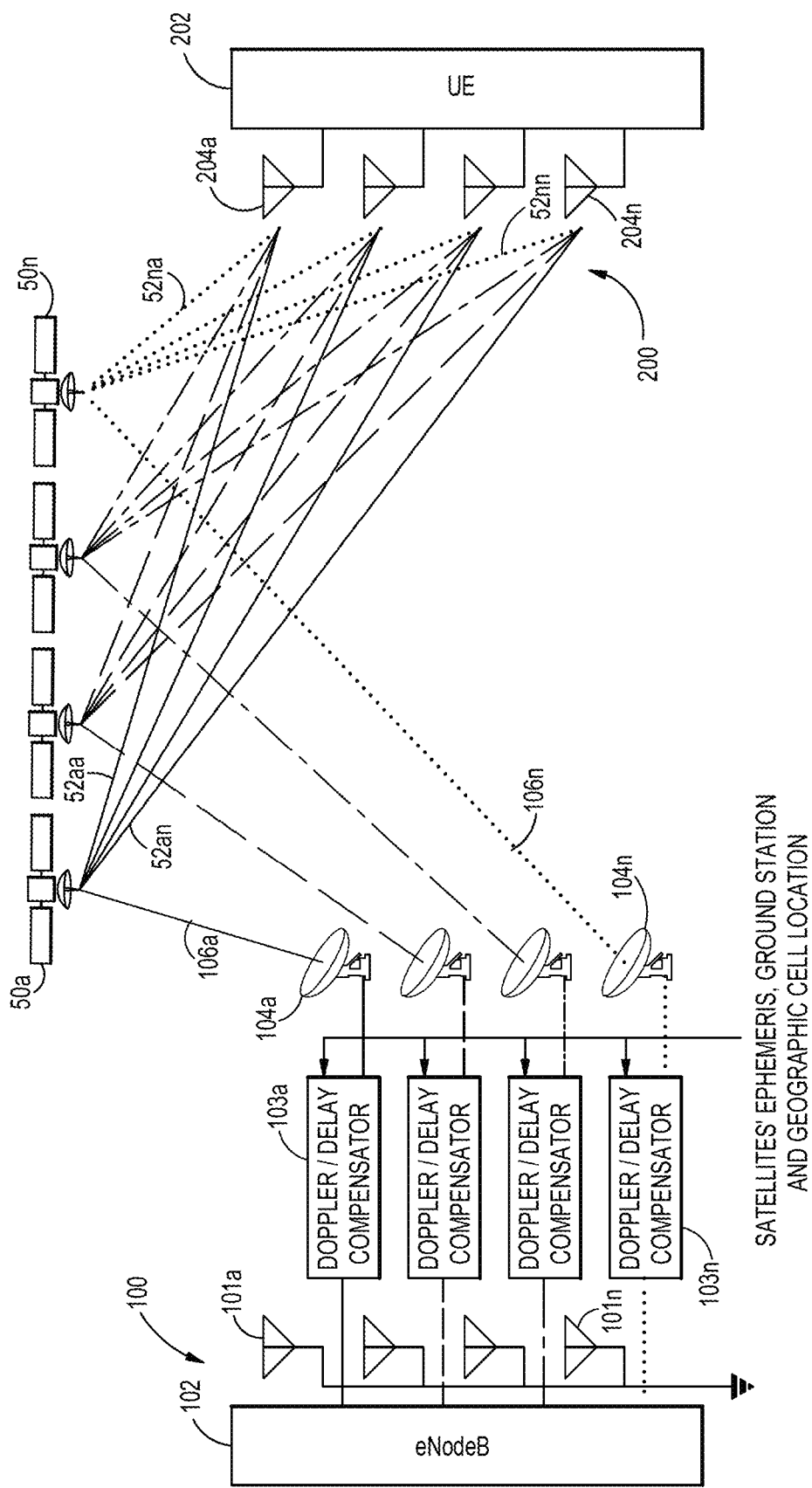
FIG. 2 MIMO USING FOUR SUBSTANTIALLY SEPARATED SATELLITES

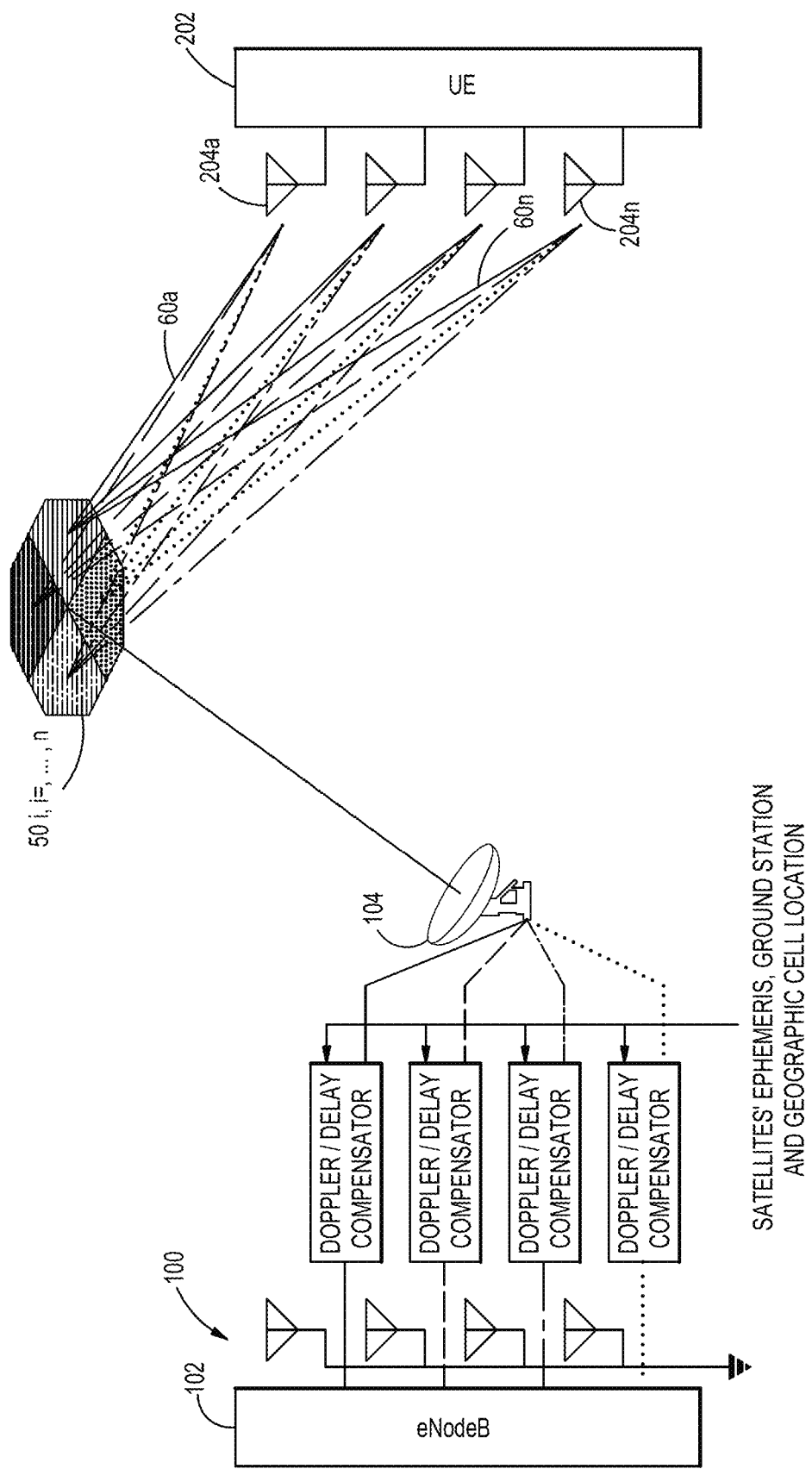
FIG. 3 MIMO USING FOUR "CLUMPED" SATELLITES

SATELLITE MIMO SYSTEM

RELATED APPLICATION

This application is a continuation application of U.S. patent application Ser. No. 16/941,120, filed on Jul. 28, 2020. The entire contents of this application is hereby incorporated by reference in its entirety.

This application claims the benefit of priority of U.S. Provisional Application No. 62/884,951, filed Aug. 9, 2019, and U.S. Provisional Application No. 62/936,955, filed Nov. 18, 2019, the content of which are relied upon and incorporated herein by reference in its entirety.

BACKGROUND OF THE INVENTION

Field of the Invention

The present invention relates to telecommunications systems. More particularly, the present invention relates to the use of Multiple Input Multiple Output (MIMO) involving a satellite system.

Background of the Related Art

A current terrestrial based communication system is shown in FIG. 1. The communication system has a base station 10 and User Equipment (UE) 20. The base station 10 includes a processing device such as an eNodeB 12, and multiple antenna 14a . . . 14n. The UE 20 has one or more processing devices or UE terminals 22, also referred to as user terminals, terminal devices or user devices, and include for example a mobile device (e.g., smartphone). The UE 20 also includes one or more antenna 24a . . . 24n and, in the embodiment shown, the UE has four antennas 24 operating at same frequency. The antennas 24 are spaced apart, by design, at about one-half the wavelength or higher.

As further illustrated, communication occurs between the base station 10 and the UE terminals 20. Data is transmitted/received from the eNodeB to/from the UE terminals 20 via the respective base station antennas 14a-14n and UE antennas 24a . . . 24n. More specifically, data is transmitted from each of the multiple base station antennas 14a . . . 14n at different respective frequencies. For example, a first signal 16a is sent from the first base station antenna 14a, a second signal 16b is sent from the second base station antenna 14b, and an $n^{th}$ signal is sent from the $n^{th}$ base station antenna 14n, all at the same frequency. The first, second and $n^{th}$ signals 16a . . . 16n could be viewed as same data stream at a high rate or four parallel data streams, each at a lower data rate.

The UE antenna 24a-24n each receive the first-$n^{th}$ signals 16a . . . 16n from the base station antenna 14. The UE terminal 24 might then select the strongest/best of those first-$n^{th}$ signals 16a . . . 16n or using Maximal Ratio Combining (MRC) to improve the received signal quality if 16a . . . 16n contain the same data stream or use Spatial Multiplexing (SM) to increase the received data rate if 16a . . . 16n contain different data streams.

We describe how to extend the base station antenna signals to multiple antennas on a satellite constellation so that a UE can communicate, utilizing MIMO, when there is no base station 10 in a terrestrial range from the UE. 20.

BRIEF DESCRIPTION OF THE FIGURES

FIG. 2 shows the satellite relay system in accordance with an example of the present invention; and FIG. 3 shows another embodiment of the satellite relay system in accordance with an example of the present invention.

DETAILED DESCRIPTION OF THE INVENTION

Figure 1:
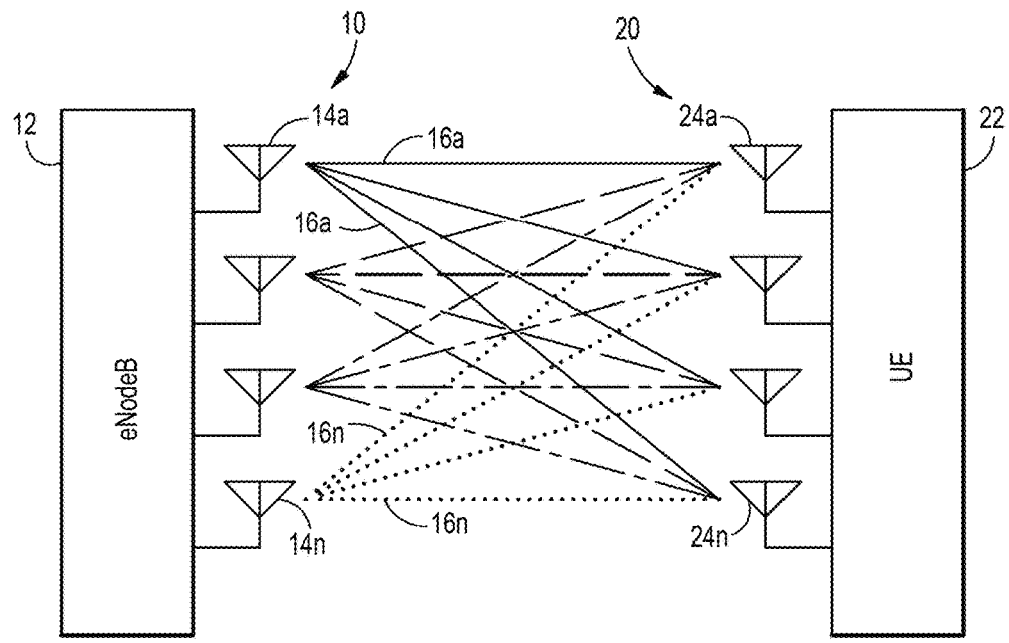
FIG. 1 shows the terrestrial communication system in accordance with the prior art.

In describing the illustrative, non-limiting embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several embodiments of the invention are described for illustrative purposes, it being understood that the invention may be embodied in other forms not specifically shown in the drawings.

Turning to the drawings, FIG. 2 shows the satellite relay communication system in accordance with one non-limiting example of the present invention. The communication system includes a base station 100 and User Equipment (UE) 200. The system also makes use of one or more relay device such as satellites 50a . . . 50n, that produces multiple beams that each cover a small area (cell) on ground, to conduct bi-directional commination between the base station 100 and the UE 200 which is located within one of the covered area (cell).

The base station 100 includes a processing device such as an eNodeB 102, and multiple directional satellite antennas 104a . . . 104n. As shown, the standard base station antennas 101a . . . 101n can also be located at the base station 100. A Doppler/Delay compensator 103a . . . 103n, that compensates the Doppler/Delay to constant values at the center of each beam regardless the satellite altitude, can be provided between the eNodeB 102 and each of the directional antennas 104a . . . 104n, as shown.

Each UE 200 have one or more processing devices or UE terminals 202, such as a mobile device (e.g., smartphone), and one or more antenna 204a . . . 204n. In the embodiment shown, a single UE terminal 202 has four antennas 204, though the UE can have more or fewer antennas 204 though preferably has at least two antennas 204.

As further illustrated in FIG. 2, the base station 100 communicates with the UEs 200 via one or more relay devices, here shown as satellites 50a . . . 50n. The satellites 50 can be in LEO, MEO, or GEO. Each ground station/UE can be covered by (in communication with) four beams, each from one of the four satellites 50a . . . 50n, though the invention can operate with more or fewer satellites 50.

The eNodeB 102 routes (after delay and Doppler compensation by the Doppler/Delay compensator 103, that is dependent on the ground station location, the ephemeris of each satellite in view and the center of the cell in which the UE is located) the signal(s) to/from each of the directional antenna 104a . . . 104n. Each directional antenna 104 is pointed to and communicates with one respective satellite 50a . . . 50n. Accordingly, the first directional antenna 104a transmits a first signal 106a with the first satellite 50a, and the $n^{th}$ directional antenna 104a transmits an $n^{th}$ signal 106n with the n$^{th}$ satellite 50n, where each of the signals 106a ... 106n can include the same data stream or different data streams at the same or different frequencies. The satellites 50a ... 50n receive the respective signals 106a ... 106n on an uplink and retransmit or broadcast those signals on a downlink as 52aa ... 52nn to each of the UE antennas 204 for each of the UEs 200 in the forward link path. The return link flow is reversed.

That is, each UE antenna 204a ... 204n receives all of the downlink signals 52aa ... 52nn from all of the satellites 50a ... 50n. Thus, the first UE antenna 204a receives the first through n$^{th}$ downlink signals 52aa ... 52na from the first through n$^{th}$ satellites 50a ... 50n, the second UE antenna 204b receives the first through n$^{th}$ downlink signals 52ab ... 52nb from the first through n$^{th}$ satellites 50a ... 50n, and the n$^{th}$ UE antenna 204n receives the first through n$^{th}$ downlink signals 52an ... 52nn from the first through n$^{th}$ satellites 50a ... 50n. For example, the first satellite 50a sends the first downlink signal 52aa to the first UE antenna 204a and the n$^{th}$ downlink signal 52an to the n$^{th}$ UE antenna 204n, and the n$^{th}$ satellite 50n sends the n$^{th}$ downlink signal 52na to the first UE antenna 204a and the nth downlink signal 52nn to the nth UE antenna 204n. The UE terminals 202 can then select the strongest/best signal from among the received downlink signals 52aa ... 52nn or using Maximal Ratio Combining (MRC) to improve the received signal quality if 52aa ... 52nn contain the same data stream or use Spatial Multiplexing (SM) to increase the received data rate if 52a ... 52n contain different data streams.

It is further noted that communication also occurs from the UEs 200 to the base station 100 in return link. That is, the UE terminals 202 transmit signals via each of the antennas 204a ... 204n to all of the satellites 50a ... 50n. The satellites 50a ... 50n retransmit those signals to a respective one of the directional antennas 104a ... 104n. The first satellite 50a receives the signals from each antenna 204a ... 204n and retransmits the aggregated data to the first directional antenna 104a, the second satellite 50b receives the signals from each antenna 204a ... 204n and retransmits the aggregated data to the second directional antenna 104b, and the n$^{th}$ satellite 50n receives the signals from each antenna 204a ... 204n and retransmits the aggregated data to the n$^{th}$ directional antenna 104n.

The Doppler/Delay compensator 103 receives the aggregated data from the respective directional antenna 104a ... 104n. The compensator compensates each antenna signal for delay and Doppler (based on the UE's cell center, the satellites' ephemeris and the ground station location) before sending them to the eNodeB 102 serving the UE cell, such as in U.S. Pat. No. 9,973,266 and/or U.S. Publication No. 2019/0238216, which are hereby incorporated by reference in their entireties. That eNodeB 102 can then select the strongest/best signal from among the received downlink signals 104a ... 104n or using Maximal Ratio Combining (MRC) to improve the received signal quality if 204a ... 204n contain the same data stream or use Spatial Multiplexing (SM) to increase the received data rate if 204a ... 204n contain different data streams.

Referring now to FIG. 3, another example embodiment of the invention is shown. The base station 100 communicates with the UEs 200 via one of the relay devices, here shown as satellites 50i (i can be any from a to n). Each ground cell can be covered by multiple beams 60a ... 60m from the same satellite 50i with either different polarization, different phase centers, and/or any combinations. The beams with different phase centers can be produced by different physical antennas or formed by the different portions of the same phased array antenna as illustrated in FIG. 3 and disclosed in U.S. Pat. No. 9,973,266 and/or U.S. Publication No. 2019/0238216. Thus, the satellite 50 has a large aperture and each antenna 204 communicates with all beams from the corresponding sub-aperture that cover the same cell as shown.

The multiple beams 60a ... 60n from the same satellite 50i together with the UE antennas 204a ... 204n provide another approach for the MIMO functionality. In the forward link, the Doppler/Delay compensated signals are all transmitted to the satellite 50 via the same directional antenna 104. The Dopplers are different based on the different transmit frequencies used on the ground station to satellite link (even though, unlike in FIG. 1, satellite ephemeris is the same on all antenna signals). Even though the satellite ephemeris is the same for all signals, the frequencies they are uplinked are different; hence, a Doppler compensator is provided for each signal. The delays are the same (unlike FIG. 1).

In the reverse link, the aggregated signals from the satellite 50 are received at the directional antenna 104 and separated (by the downlink frequency for different beams of different polarization or phase centers) to the respective Doppler/Delay compensators.

The satellite system can operate in two MIMO modes, diversity and Spatial Multiplexing (SM). The diversity mode is particularly suitable for UE terminals having only a single antenna or the link connectivity is more critical than throughput. In the diversity mode, the multiple base station antennas as illustrated in FIG. 2 and/or the single base station antenna as indicated in FIG. 3 (104), in the forward link, send the same information to the satellites 50, and the UE 200 uses the strongest/best signal received from the satellites/beams or using Maximal Ratio Combining (MRC) to improve the received signal quality. In the return link, the multiple UE antennas 204 send the same information to the satellites 50, and the eNodeB 102 uses the strongest/best signal received from the base station antennas 104 or using Maximal Ratio Combining (MRC) to improve the received signal quality. Here, the link reliability as well as the link availability is improved.

The SM mode is particularly suitable for UE terminals having multiple antennas, as shown in FIG. 2 and/or FIG. 3, to improve throughput. In the forward link SM mode, different data streams are downlink to the same cell where a UE or UEs is attached to the satellite network in the same frequency band. The UE terminal 202 then performs spatial multiplexing on the received signals 52 and/or 60 to aggregate the data streams together. In the return link SM mode, different data streams are uplink to the different satellites 50 and/or the same satellite using different beams 60 via the multiple antenna 204 of a UE in the same frequency band. The eNodeB 102 then performs spatial multiplexing on the received signals from different base station antennas/beams 104 to aggregate the data streams together. In the SM mode, the throughput is improved, with up to approximately n times capacity without increasing bandwidth requirements.

Figure 4:
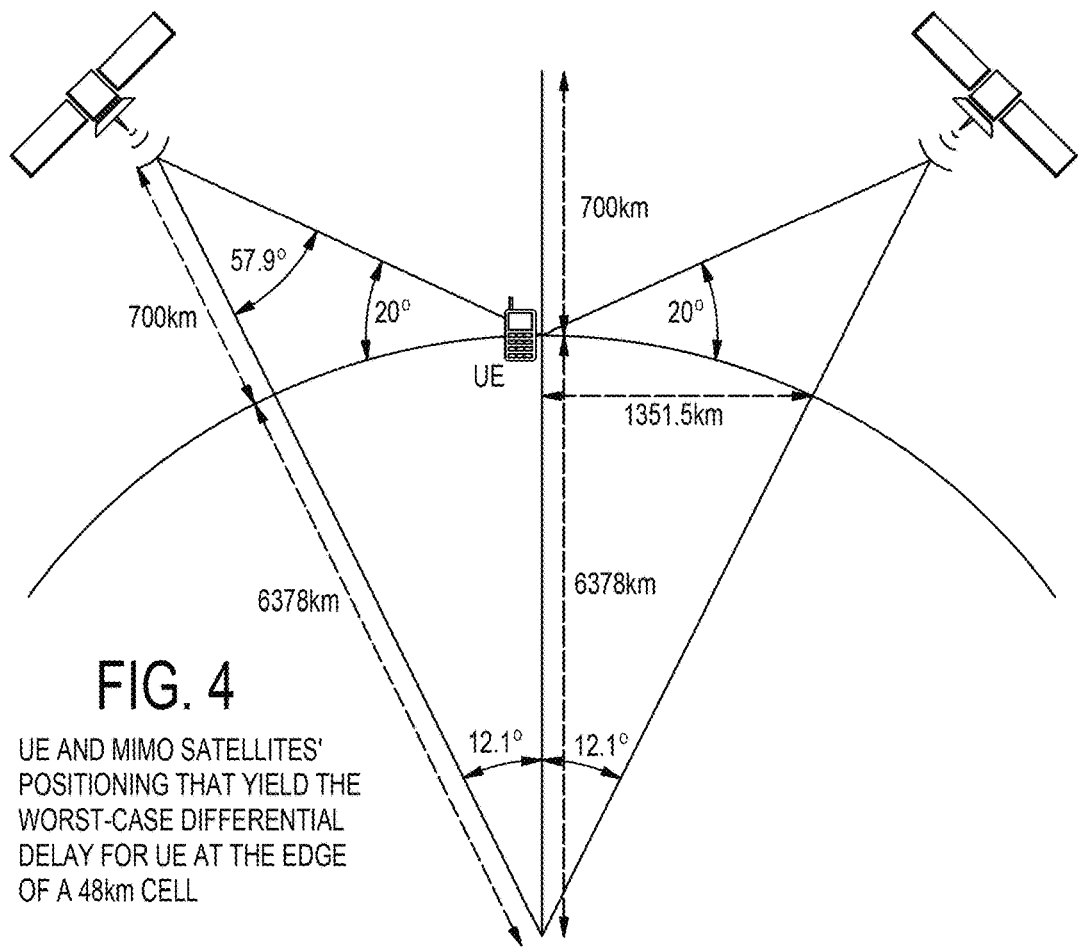
FIG. 4 shows the worst-case differential delay that a UE sees at the edge of its cell (assuming that delay and Doppler are compensated at the center of a cell).

Another consideration in selecting the constellation configuration of either FIG. 2 or FIG. 3 is the maximum differential delay the MIMO system can tolerate. For example, the worst-case differential delay (i.e., for a 140° separated MIMO satellite configuration shown in FIG. 4) for a 48 km beam diameter can be up to 140 µs, more than 2 LTE symbols which would be an issue for MIMO signals coming from two satellites' paths. As a result, either the MIMO system needs to adapt to the substantial differential delays between its antennas (to utilize the satellite constellation configuration of FIG. 2) or use a "clumped" satellite configured constellation (as in FIG. 3).

For the case in FIG. 2, the serving eNodeB 102 can decide one of the satellites, say 50a downlink (DL) arrival time as the reference for other satellites, say 50b, 50c and 50d (for 4×4 MIMO), and adjust the transmit (Tx) time of the physical resource blocks (PRBs) for particular MIMO UE accordingly, so that all four MIMO signals from four satellites can be time aligned for the UE. The downlink arrival times are identical for all satellites at the center of the cell, but are different for other locations (the general case) in the cell. The eNodeB applies the timing advances on each of the satellites for the PRBs allocated for each of the user equipment terminals in MIMO operation so that the MIMO signals from all the satellites arrive the user equipment terminals at the same time for MIMO operation. The eNodeB processing device also schedules the eNodeB PRBs with DL timing advances for specific UEs in MIMO operations on different RF ports, and avoid collision on timing adjustment. For example, in the MIMO for LTE, the transmit (Tx) signal needs are adjusted in eNodeBs so that they arrive at the UE antennas within the required timing range (such as 60 ns). However, each UE uses different physical resource blocks (PRBs) than another UE (in the same cell). Thus, the PRBs used are time adjusted, depending on the UE location, so that MIMO processing can be applied at the UE.

Figure 5A:
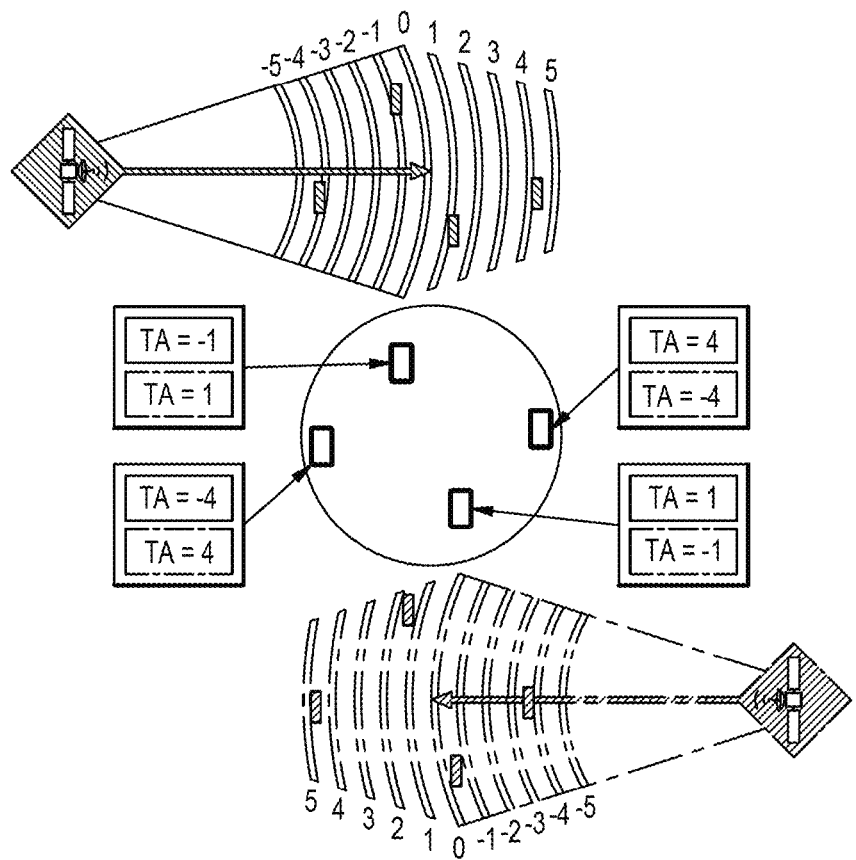
FIGS. 5(a), 5(b) show the eNodeBs handling of differential delay bands from each satellite point of view (assuming the case described by FIG. 3 and FIG. 4).
Figure 5B:
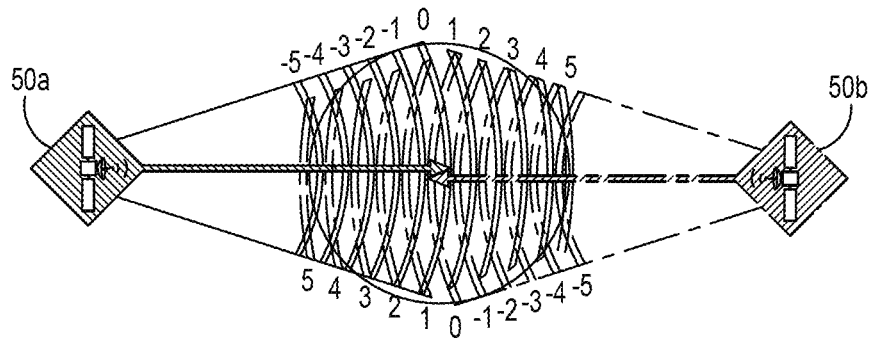

FIGS. 5(a), (b) show two satellites' MIMO operation need its eNodeB handling their DL signal arrival time alignment regarding the UEs. For the 2×2 MIMO: UE in two satellites overlapping cell, has UL activity which provide the opportunity for an eNodeB, that has two RF ports via the two satellites' beams serving the cell, to work out the two timing advance (TA)s for the two RF paths. In the 2×2 MIMO operation, the delta TA can be found, FIG. 5 illustrate the TA bands relative to the cell center, TA band numbers on top refer to the satellite on the left, and the bottom for the right. The TA bands refer the TA values, for illustration purposes TA band labels are used. The eNodeB puts half of the delta TA on the PRBs (allocated for the UE under concern) at the relevant RF port, so that all the symbols from the two satellites arrive at the UE at the same time. Similarly, same applies for 4×4 MIMO.

In another example embodiment, communication between the directional antennas (gateway antennas) 104 and the satellites 50 can be in the Ka-band, Q-band/V-band, and/or optical, and communication between the satellites 50 and the UE terminal antennas 204 can be any 3GPP and 5 G band or bands. At the gateway, cellular traffic is digitized and transferred to/from the custom eNodeB 102. The present invention does not require any modification to the UE terminals 202, which connect to the satellite beams as they would to a local cell tower. The eNodeB 102 provides a standards compliant interface to unmodified ground-based devices, allowing them to connect as they would to a local tower while adapting non-standard extra functionality to meet standard UE expectations, including MIMO operation; compensating for the effects of the satellite communication system such as excessive delays and Doppler shift.

As noted, the number of satellites in view (from the UE) can be fewer than n. In case of 3 satellites in view of a UE and assuming the UE has 4 antennas, with the system capable of handling 2×2 MIMO or 4×4MIMO, the system will generate 2 beams covering the same UE (cell) from one of the satellites, so the system will see 4 antennas from UE and 4 beams from satellites (1 beam each from 2 satellites and 2 beams from the 3rd satellite). The eNodeB and UE will estimate the channel state indication (CSI) matrix. If the rank of this matrix is 4, then the system will be able to achieve the benefits 4×4 MIMO, if the rank is lower, the benefits are correspondingly reduced. A similar situation arises when just two satellites, or just one, can be viewed by the UE.

The system and method of the present invention can be implemented using standard UEs by computer software that accesses data from an electronic information source. The software and the information in accordance with the invention may be within a single processing device, such as at the satellite or the eNodeB, or it may be in a central processing networked to a group of other computers or other electronic devices. The software and information may be stored on a medium such as a memory or data storage device. The entire process is conducted automatically by the processor, and without any manual interaction. A medium also includes one or more non-transitory physical media that together store the contents described as being stored thereon. In addition, unless indicated otherwise the process can occur substantially in real-time without any delay or manual action.

The foregoing description and drawings should be considered as illustrative only of the principles of the disclosure, which may be configured in a variety of ways and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A base station configured to communicate with a terminal station having a plurality of terminal station antennas, the base station comprising:
   a set of directional antennas, each of the set of directional antennas configured for communication with one or more satellites that are in view of the terminal station, the communication including a first set of signals transmitted to the one or more satellites and a second set of signals received from the one or more satellites; and
   a processing device operatively coupled to the set of directional antennas; the processing device being configured to:
   adjust transmit times of physical resource blocks (PRBs) associated with the terminal station according to downlink arrival times for signals between the one or more satellites and the plurality of terminal station antennas so that a set of downlink signals from the one or more satellites to the terminal station are time aligned; and
   cause the set of directional antennas to transmit the first set of signals to the one or more satellites and cause retransmission of the first set of signals as the set of downlink signals from the one or more satellites to the terminal station according to the adjusted transmit times of the PRBs;
   wherein adjustment of the transmit times of the PRBs includes application of timing advances on each of the one or more satellites that are in view of the terminal station; and
   wherein application of the timing advances is performed via different RF ports of the base station.

2. The base station of claim 1, wherein the first set of signals includes a set of data streams, each data stream in the set corresponding to one of the set of directional antennas.

3. The base station of claim 2, wherein each data stream in the set is the same.

4. The base station of claim 2, wherein each data stream in the set is at a same frequency.

5. The base station of claim 2, wherein each data stream in the set is at a different frequency.

6. The base station of claim 1, wherein:
the one or more satellites is a plurality of satellites;
the processing device is configured to select a given one of the plurality of satellites as a reference satellite; and
the processing device is configured to adjust the transmit times of the PRBs associated with the other ones of the plurality of satellites relative to the reference satellite.

7. The base station of claim 1, wherein:
the base station is configured to communicate with each of a plurality of terminal stations including the terminal station, via the one or more satellites that are in view of the plurality of terminal stations, each terminal station having a corresponding plurality of terminal station antennas; and
each terminal station of the plurality of terminal stations uses different PRBs than other ones of the plurality of terminal stations located in a same cell.

8. The base station of claim 7, wherein the PRBs of each terminal station in the same cell are time adjusted depending on a physical location of each terminal station.

9. A base station configured to communicate with a plurality of terminal stations each having a corresponding plurality of terminal station antennas, the base station comprising:

a set of directional antennas, each of the set of directional antennas configured for communication with one or more satellites that are in view of the plurality of terminal stations, the communication including a first set of signals transmitted to the one or more satellites and a second set of signals received from the one or more satellites; and a processing device operatively coupled to the set of directional antennas; the processing device being configured to:
adjust transmit times of physical resource blocks (PRBs) associated with each of the terminal stations according to downlink arrival times for signals between the one or more satellites and the corresponding pluralities of terminal station antennas so that a set of downlink signals from the one or more satellites to the plurality of terminal stations are time aligned; and
cause the set of directional antennas to transmit the first set of signals to the one or more satellites and cause retransmission of the first set of signals as the set of downlink signals from the one or more satellites to the plurality of terminal stations according to the adjusted transmit times of the PRBs;

wherein adjustment of the transmit times of the PRBs includes scheduling the PRBs with downlink timing advances for specific ones of the plurality of terminal stations in multiple input multiple output (MIMO) operation on different RF ports of the base station.

* * * * *